April 21, 1936.  F. C. FRANK  2,038,213
BRAKE
Filed May 3, 1934  3 Sheets-Sheet 1

INVENTOR.
Frederick C. Frank.
BY
ATTORNEY

April 21, 1936.   F. C. FRANK   2,038,213
BRAKE
Filed May 3, 1934   3 Sheets-Sheet 2

INVENTOR.
Frederick C. Frank
BY F. P. Keiper
ATTORNEY

April 21, 1936. F. C. FRANK 2,038,213
BRAKE
Filed May 3, 1934 3 Sheets-Sheet 3

INVENTOR.
Frederick C. Frank.
BY
ATTORNEY

Patented Apr. 21, 1936

2,038,213

UNITED STATES PATENT OFFICE 2,038,213

BRAKE

Frederick C. Frank, South Bend, Ind., assignor to Bendix Aviation Corporation, South Bend, Ind., a corporation of Delaware Application May 3, 1934, Serial No. 723,789

17 Claims. (Cl. 188—152)

This invention relates to brakes and more particularly to drum brakes of the internal expanding type, particularly adapted for use in connection with aircraft but, however, not necessarily limited thereto.

In the construction of aircraft brakes, it is highly essential that the brake be as light as possible, yet have sufficient strength to safely withstand all of the severe stresses to which the brakes and the landing gear upon which the brakes operate, may be subjected. The use of light metal castings for various landing gear purposes although offering sufficient strength has often led to excessive weight, while the use of stampings alone, unless unusually heavy would not ordinarily give the requisite safety factor. This invention is, therefore, directed to a novel brake construction wherein the usual backing plate may be replaced by a composite light structure, part casting and part stamping and which light structure is peculiarly arranged and adapted so as to afford minimum stresses as well as extreme compactness in a brake of the internal expanding drum type.

It is accordingly an object of this invention to provide a brake having a backing plate or support plate of composite construction.

Another object of the invention is to provide a brake in which the backing or support plate is constructed from a cast spider and a light stamping.

A further object of the invention is to provide an aviation brake wherein the support plate or spider is substantially in the same plane as a plane passing through the center line of the brake shoes, whereby stresses are reduced to a minimum.

A still further object of the invention is to provide a brake having minimum hub thickness.

Still another object of the invention is to provide a light composite hydraulic cylinder construction wherein the support may be a casting and the cylinder proper a stamping inserted in a suitable recess in the casting.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings, where like reference numerals indicate like parts:

Figure 1:
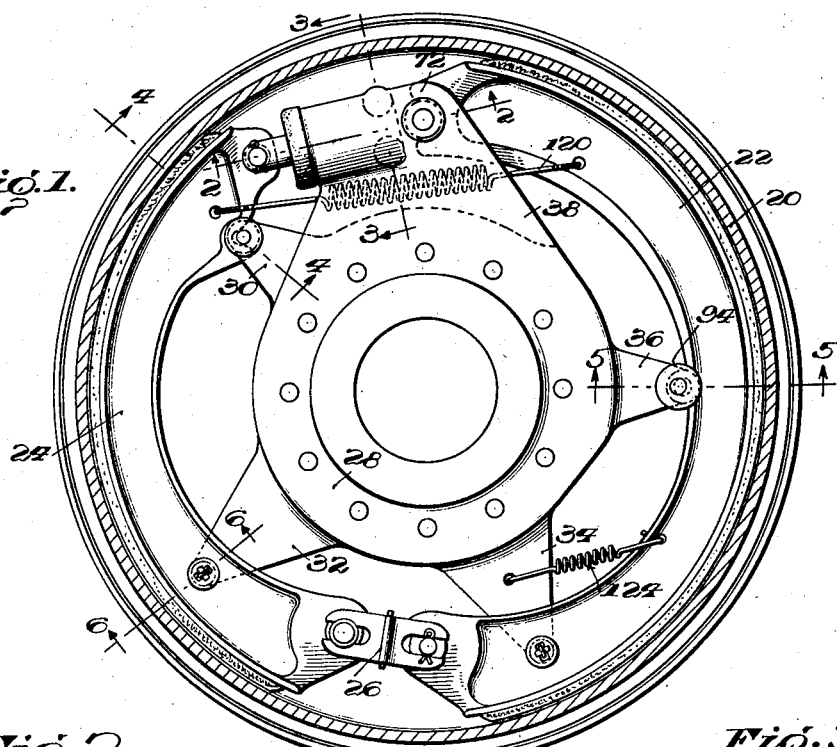
Fig. 1 is a front elevation of one form of brake, the brake drum being shown in section just inside the brake drum head.
Figure 2:
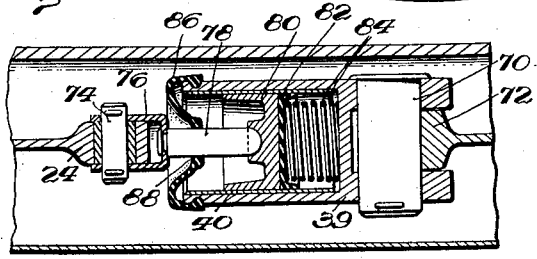
Fig. 2 is a section taken on the line 2—2 of Fig. 1, illustrating the details of the hydraulic actuating cylinder and brake shoe anchor.
Figure 3:
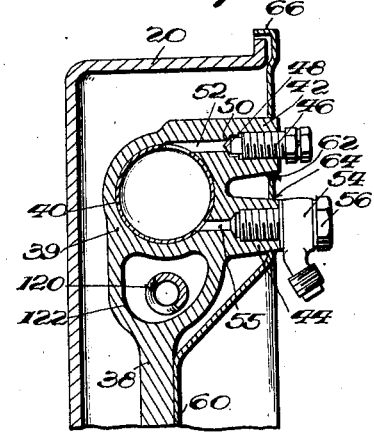
Fig. 3 is a section through the cylinder taken on the line 3—3 of Fig. 1 and illustrating the composite supporting structure.

Referring to Fig. 1 there is shown therein the usual brake drum 20, brake shoes 22 and 24 connected together by a common form of adjustable link 26. These shoes are supported by the novel support structure comprising a spider 28 having radial arms 30, 32, 34, 36 and 38 extending therefrom. The arm 38 is particularly provided with a hydraulic cylinder support construction and provision for anchoring means. This is best illustrated in Figs. 2 and 3, the latter figure illustrating a section through the arm and cylinder. As shown, the spider arm 38 is thickened at its outer extremity 39 and bored to receive a cylinder liner 40 for hydraulic actuation of the brake. The arm 38 at its thickened portion is also provided with suitable bosses or lateral projections 42 and 44, which are provided with bores or apertures extending into the cylinder. One of these apertures may serve to bleed the cylinder of air while the other may be connected to any suitable master cylinder for brake actuation, as is well understood in the art. For this purpose the boss 42 is fitted with a suitable needle valve construction comprising a threaded plug 46 having a conical end 48 seated in a shoulder 50 of the bleed port 52, while a pipe fitting such as shown at 54 is held in engagement with the boss 44 and preferably connected to the brake actuating port 55 by a suitable hollow apertured bolt 56 as will be well understood in the art.

As further illustrated in Figure 3, the spider 28 has secured to it on one side, the stamping 60 which forms in conjunction with the spider a suitable backing plate of especially light but sufficiently strong construction. The backing plate is apertured at 62 and 64 to fit over the bosses 42 and 44 and is flanged at its outer circumference 66 in order to prevent dirt and foreign matter from entering the brake drum 20.

In Fig. 2, the enlarged end 39 of the spider arm 38 is shown in section in a manner so as to illustrate the anchoring pin 70 of the brake, which pin is arranged transversely through the arm and immediately behind the cylinder. The brake shoe 22 is provided with a forked end 72 adapted for pivotal engagement with the anchor pin 70. The other brake shoe 24 is shown as connected to a hydraulic piston 80 by means of a transverse pin 74 pivotally carrying a clevis 76 and a piston pin 78. In order to prevent leakage of hydraulic liquid around the piston 80 a suitable washer 82 is provided on the inner face thereof and an axially arranged spring 84 within the cylinder retains the washer against the piston face. To protect the open end of the cylinder from the entrance of dust, dirt and foreign matter, a flexible rubber cup 86 having an aperture 88 through the center for the piston pin 78 is stretched around the mouth of the cylinder to completely seal the same.

Figure 4:
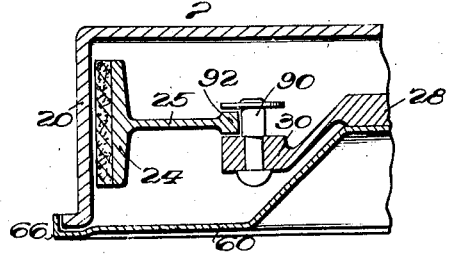
Fig. 4 is a section through a brake shoe release position stop taken on a radial plane indicated by line 4—4 of Fig. 1, showing another portion of the composite supporting structure.
Figure 5:
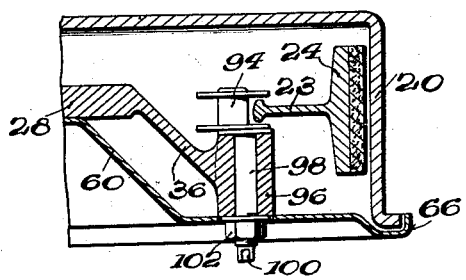
Fig. 5 is a section through an eccentric adjuster taken on a radial plane indicated by line 5—5 of Fig. 1 and further illustrating the composite supporting structure.
Figure 6:
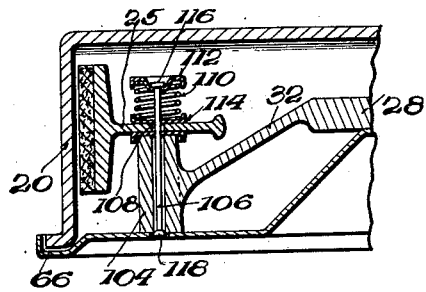
Fig. 6 is a section through a brake shoe steady rest taken on a radial plane indicated by line 6—6 of Fig. 1.

In order to support the shoes on the spider and to provide a release position stop, the radial arm 30 of the spider 28 which arm is adjacent the cylinder and anchor supporting arm 38, is provided with a pin 90, as shown in Fig. 4, which pin is adapted to engage a recess 92 along the inner contour of the brake shoe web 25. Suitable means for adjusting the brake for wear is illustrated in Fig. 5 wherein there is shown, mounted on the arm 36 of the spider 28, an adjustable eccentric 94 carried on a rotatable pin journalled in a boss 96 on the end of the arm 36. The end of the pin 98 may be suitably shaped as at 100 to receive a spanner and the pin may be locked into any adjusted position by the tightening of the lock nut 102, so that the eccentric may engage the inner edge of the shoe web 23 and fix its release position. In order to steady the connected ends of the shoes which are remote from the anchor and cylinder, suitable steady rests are provided as shown in Fig. 6, which steady rests are mounted on the arms 32 and 34 of the supporting spider. For this purpose each steady rest arm is provided with an apertured boss 104 and the adjacent shoe web 25 has a slot 108 in alignment therewith. A pin extending through the boss aperture and shoe slot is threaded through a pair of washers separated by a short coil spring 110, which spring is held in compression by suitable heads 116 and 118 formed on either end of the pin.

In order to cause the brake to return to release position, the shoes 22 and 24 are connected by a spring 120 which, as shown in Fig. 3, passes through the longitudinal aperture 122 in the enlarged head 39 of the spider arm 38. A further spring 124 may be provided to urge the shoe 22 towards the spider arm 34 and thus retain the shoe web in engagement with the adjustable eccentric 94 on the arm 36.

As heretofore been noted, the spider 28 which may be made of a light aluminum casting is preferably shaped and trimmed to a size sufficient to carry a braking load or shocks incident to brake application and as such takes the form of the spider illustrated, the arm 38, which supports the anchor and cylinder being necessarily of larger dimensions than the other arms. Thus the central supporting structure is maintained as light as practical and permissible, and by the addition of the light stamping 60 as heretofore described, the brake is adequately protected against entrance of foreign matter, dirt, grease and the like.

Figure 7:
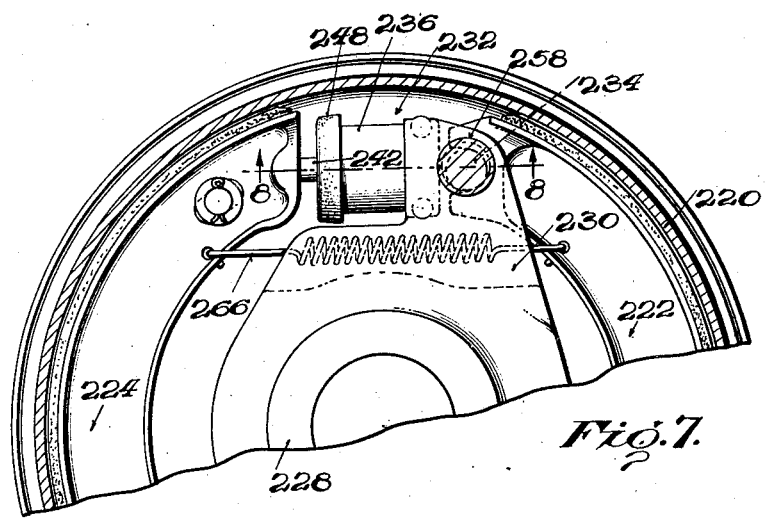
Fig. 7 is a front elevation of a modified form of brake, the brake drum being shown in section just inside the brake drum head.

Referring to the modification of Fig. 7, there is shown therein the usual brake drum 220, shoes 222 and 224 which may be connected at their ends in the manner illustrated in Fig. 1, and a support member 228. A radially extended arm 230 on support 228 is adapted to carry a hydraulic cylinder 232 and an anchor pin 234 directly therebehind.

Figure 8:
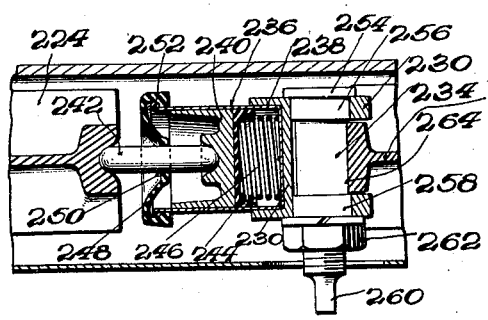
Fig. 8 is a section through the cylinder and anchor of Fig. 7 taken on the line 8—8.

As further illustrated in the section of Fig. 8, the cylinder is shown comprising a cup-shaped member 236 which may be drawn or otherwise fabricated, seated in a corresponding cup shaped recess 238 formed in the end of the arm 230. A piston 240 adapted to reciprocate within the cylinder is adapted to thrust the brake shoe 224 through a compression or piston pin 242. To prevent leakage of hydraulic fluid, a cup washer 244 is seated on the inner face of the piston and held in place by a light axially arranged coil spring 246 located within the cylinder. To prevent entrance of dirt or foreign matter into the open end of the cylinder, a flexible rubber cup 248 having an aperture 250 for the pin 242 is provided over the open mouth of the cylinder and held in place by the annular end bead 252 on the cylinder. Immediately behind the cylinder, there is provided an anchor pin 234 which, in the particular modification, is of the eccentric type although a pin as shown in Fig. 1 may also be employed. The pin comprises a head 254 on one end, spaced bearing portions 256 and 258 journalled in the apertures provided therefor in a bifurcated portion of arm 230, and an eccentric body portion 264 of reduced diameter between the spaced bearing portions. By rotation of the anchor pin by means of the flat 260 the shoe 222, which engages the central eccentric portion of the anchor pin, may be moved toward or away from the cylinder or radially outward or inward from the brake drum and the pin may be locked in any adjusted position through the lock nut 262. The return spring 266, as in Fig. 1, connects the shoes 224 and 226 and urges them towards their release position. This spring may also pass through a recess in the support arm in the manner shown in Fig. 3 of the modification of Fig. 1 and it will, of course, be understood that steady rests and wear adjustments may be provided on the support as shown in Fig. 1.

Figure 9:
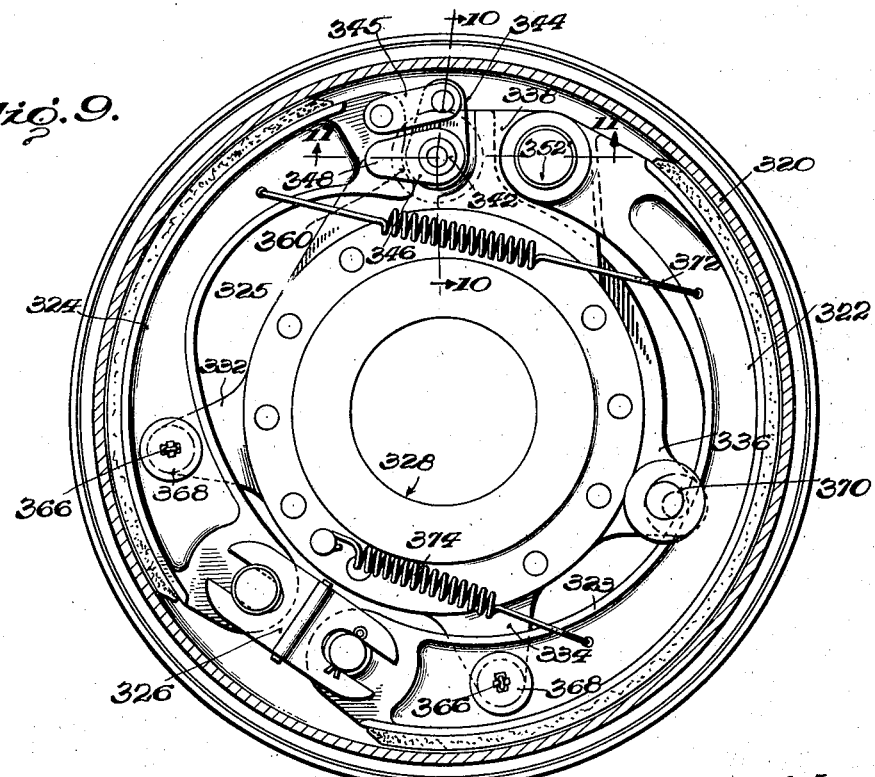
Fig. 9 is a further modified form of brake shown in front elevation, the brake drum being shown in section just inside the brake drum head.
Figure 10:
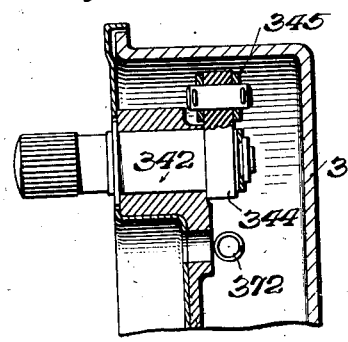
Fig. 10 is a section illustrating the composite backing plate structure and the mechanical actuating means of the brake of Fig. 9 and is taken on section line 10—10.
Figure 11:
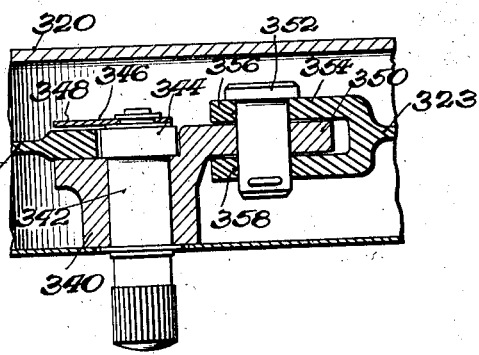
Fig. 11 is a section of Fig. 9 further illustrating the actuating means and its relation to the anchor and is taken on the line 11—11.

In Fig. 9 there is illustrated a brake of the general type herein disclosed adapted for mechanical actuation. The same comprises the usual drum 320, shoes 322 and 324 connected by an adjustable link 326, and a support spider 328 having arms 332, 334, 336 and 338. The arm 338, which carries the actuating means and anchor, is provided at its end with a bearing sleeve or boss 340 in which is journalled a rock shaft 342 extending outside the brake. The shaft 342 on its inner end carries a crank 344 connected by a link 345 to the end of the brake shoe 324. A washer 346 carried on the side of the crank remote from the shaft having a lobe 348 extends over the web 325 of the brake shoe 324 to retain the shoe in alignment with the actuating crank during all stages of actuation, thus tending to prevent the link 345 from buckling.

The support arm 338 is also provided adjacent the sleeve 340 with an apertured portion 350 which is adapted to receive an anchor pin 352. In this form the web 323 of the shoe 322 is provided with a bifurcated end 354 which in turn is adapted to receive the anchor pin 352 through suitable apertures 356 and 358.

The actuated shoe 324 on its end is provided with an end abutment 360 peculiarly adapted to engage the center portion of the crank 344 when in released position. Suitable steady rests 366 and 368 carried by the arms 332 and 334 are provided to aid in supporting the connected shoe ends and an adjustable eccentric 370 is provided in the arm 336 in order to take up wear during the life of the brake. A return spring 372 is provided to return the shoes to release position and a spring 374 connected to the support plane 328 and the shoe 322 is adapted to retain the latter shoe in engagement with the eccentric adjustment when the brake is released.

The operation of each of the modified forms of brake will readily appear from the description given. In Figs. 1 and 7 the entrance of hydraulic liquid in the cylinder will force the piston outward and engage the shoes 24 and 224 respectively with the brake drum and upon sufficient pressure being applied the shoes 22 and 222 will likewise be applied to the drum and braking torque will be absorbed by the anchors 70 and 234 respectively. If the rotation direction of the drum is counterclockwise, the actuating action of the brake will be augmented due to friction contact of drum with the shoes, which in the art is known as servo-action. Rotation of the drum in the opposite direction or clockwise will diminish the actuating pressure applied by the brake and for this reason the brake is particularly adapted for use in aircraft where braking is generally applied in a single direction only. The modification of Fig. 9 operates similarly to Figs. 1 and 7 with the exception that the actuating means for applying the brake is mechanical instead of hydraulic. It will, of course, appear that any suitable form of actuating linkage may be employed to rotate the actuating crank 344 and spread the shoes 324 and 322 into engagement with the brake drum.

As will readily appear from the foregoing description, there is thus provided a form of brake peculiarly adapted for use in aviation since the structural parts thereof are as light as practice will permit. The composite construction of the backing plate, resulting from employing a support plate having only dimensions needed for the actual load or stresses to which it is subjected and the light, thin metal backing plate secured and adapted thereto provides an unusually light construction which is both adequate in strength and in protecting the brake from entrance of foreign matter. This construction also permits the brake to be considerably thinner than is often the case since the support plate has no particular thickness and is arranged in the plane substantially the same as that of the central web of the shoes. By such construction the stresses on the support are limited to those lying in the plane and no bending moments outside of the central plane can normally exist as is not the case where the anchors and cylinders are supported from a plate located on one side or other of the brake. This thin construction in aircraft permits the wheel and its bearing to be arranged closer to the supporting carriage thereby lessening the bending stresses between the stub axle and the supporting carriage and permitting these parts likewise to be made lighter.

Though several embodiments of the invention have been illustrated and described, it is understood that the invention is not limited thereto but may be embodied in various other mechanical and hydraulic forms. For example, the features shown in the mechanical actuated brake might be interchanged with the salient features of the hydraulically actuated modifications. Such changes in construction and arrangement of parts may be made without departing from the spirit of the invention, as will be apparent to those skilled in the art, and reference will, therefore, be had to the appended claims for a definition of the limits of the invention.

What is claimed is:

1. In a drum brake, a cast spider comprising a central thin disc portion lying substantially in the center plane of the brake, and a thickened leg extending therefrom having a cylinder bore arranged on an axis in said plane and substantially perpendicular to the axis of the leg, and having an aperture through said leg lying substantially in said plane and parallel to the axis of the cylinder.

2. In a brake, a cast spider comprising a central thin disc portion lying substantially in the center plane of the brake, and a thickened leg portion extending therefrom, having a tangentially-arranged cylinder bore projecting part way into said leg from one side and having an anchor pin recess on the other side of said leg.

3. In a brake, a cast brake spider having an inner disc portion, a thickened leg having a tangentially-arranged cylinder therein, an anchor means on said leg, apertured projections extending from the side of said cylinder, said apertures leading into and forming fluid connections to said cylinder, and a backing plate having a central portion adapted to lie against said central inner disc portion, and an outer offset flange portion perforated to receive said projections.

4. In a brake, a cast brake spider having a plurality of spaced legs, a cylinder and anchor in one of said legs, and friction means having adjacent separable ends operable by said cylinder and secured on said anchor and adjustably supported and guided on said legs.

5. In a brake, a cast brake spider having a plurality of radially-extending legs, a cylinder and anchor in one of said legs, friction means anchoring on said anchor and actuated by said cylinder adjustably supported and guided on said legs, and a return spring connected between the anchored and actuated ends of said friction means passing through an aperture in the cylinder and anchor leg.

6. A brake spider having an enlarged leg, having a cylinder bore tangentially-arranged and projecting part way thereinto, having a brake shoe web recess on the opposite side, and a transverse anchor pin in said recess.

7. A brake spider having a central disc portion located on the center plane of the brake, offset legs extending therefrom substantially radially, and an enlarged portion on the extremity of said legs extending substantially from the center plane of said brake to substantially the side thereof, whereby a center brake shoe web and a backing plate may be supported and carried thereby.

8. A brake having a spider comprising a central disc portion lying substantially on the center plane of the brake, offset legs extending therefrom, a backing plate secured to the center disc portion and being offset to house said legs, and means on the ends of said legs for supporting said backing plate and guiding a central web of a brake shoe.

9. A brake backing and supporting plate comprising a cast member having an annular portion and a plurality of radial offset legs extending therefrom, and a thin metal plate secured to and lying flat against the central annular portion of said cast member, said plate having an annular offset closely housing said legs.

10. A brake comprising a supporting spider including an annular center portion and radial legs extending therefrom, friction means, anchored at one end to one of said legs, a crank for actuating the free end of the friction means journaled in the anchor leg, and means for steadying and adjusting said friction means on said other legs.

11. A brake comprising a supporting spider having an annular central portion and a plurality of radially-extending legs, a boss on one of said legs having journaled therein an actuating crank, friction means having an end anchored on said leg, a boss and an end actuated by said crank, said means being slidably supported and guided on said other legs, and a thin metal stamping secured to the annular central portion of said spider and formed to closely embrace said friction means.

12. A brake comprising a supporting spider having an annular central portion and a plurality of radially-extending legs, a boss on one of said legs having journaled therein an actuating crank, friction means having an end anchored on said leg, a boss and an end actuated by said crank, said means being slidably supported and guided on said other legs, a rotatable drum adapted for engagement by said friction means, the center plane of said drum lying substantially in the plane of the central portion of said spider, and a thin metal stamping secured to the annular central portion of said spider and formed to closely embrace said friction means and said rotatable drum to protect the brake from the entrance of foreign matter.

13. A brake comprising a supporting spider having an annular central portion, and a plurality of radially-extending legs, one of which is bifurcated at its extremity, a friction shoe having a T section carried on said spider, the web of said friction shoe lying in substantially the same plane as the central portion of said spider, and positioned in the bifurcated leg and an anchoring means associated with said leg and shoe.

14. A brake comprising a supporting member having an annular central portion and a leg radially extending therefrom, circular friction means pivotally secured at one end to one side of said leg and extending around to the other side of said leg, said leg having a circular recess in the other side thereof, a cup shaped cylinder seated in said recess, a piston in said cylinder, and means connecting the piston to the friction means.

15. A brake comprising a supporting member having an annular central portion and a leg radially extending therefrom, circular friction means pivotally secured at one end to one side of said leg and extending around to the other side of said leg and providing a free end, means supported on said leg and associated with the free end of said friction means for actuation thereof, and a rotatable brake drum adapted to be engaged by said friction means.

16. A brake comprising a supporting member having an annular central portion and a leg radially extending therefrom, circular friction means pivotally secured at one end to one side of said leg and extending around to the other side of said leg and providing a free end, means supported on said leg and associated with the free end of said friction means for actuation thereof, a plurality of radial legs extending from said support and adapted to support and guide the friction means, and a rotatable brake drum adapted to be engaged by said friction means.

17. A brake comprising a supporting member having an annular central portion and a leg radially extending therefrom, circular friction means pivotally secured at one end to one side of said leg and extending around to the other side of said leg and providing a free end, means supported on said leg and associated with the free end of said friction means for actuation thereof, a rotatable brake drum adapted to be engaged by said friction means; and a pressed thin metal backing plate secured to said support and formed to closely house said friction means and drum.

FREDERICK C. FRANK.